March 11, 1930.　　　P. R. HOOPES　　　1,749,882
TRIMMING MACHINE
Original Filed Feb. 26, 1926　　4 Sheets-Sheet 1
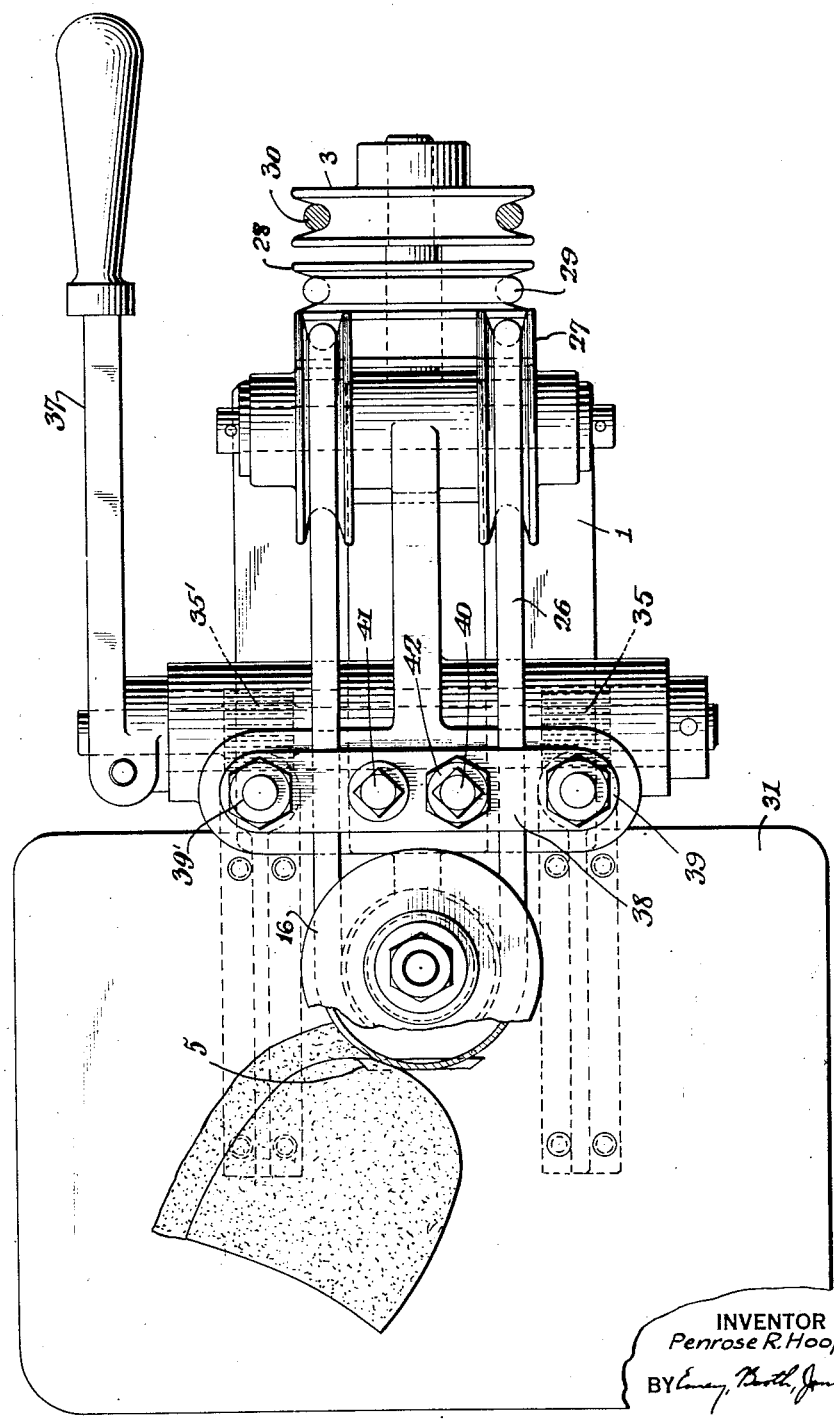
INVENTOR
Penrose R. Hoopes.
BY
ATTORNEYS

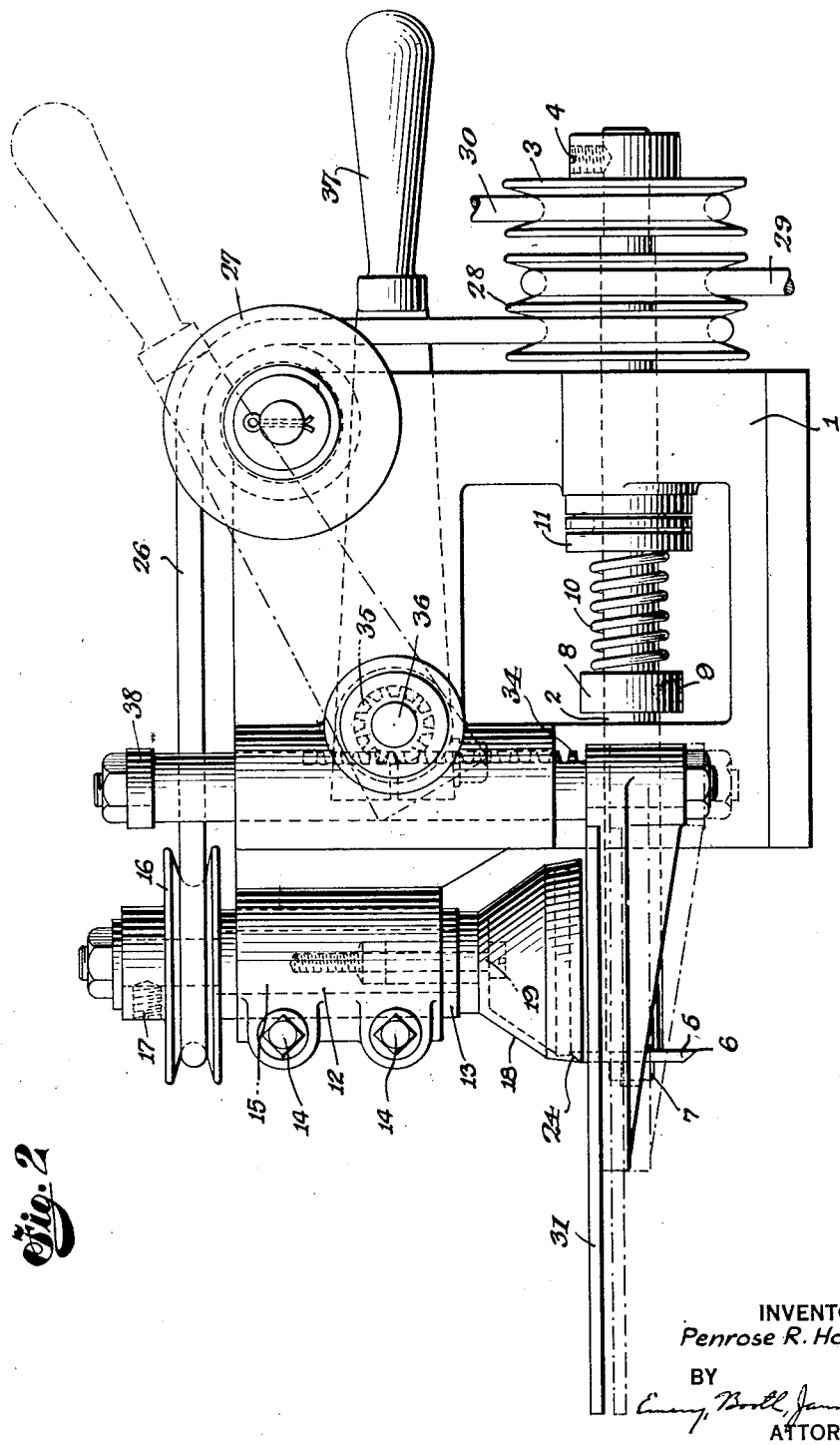

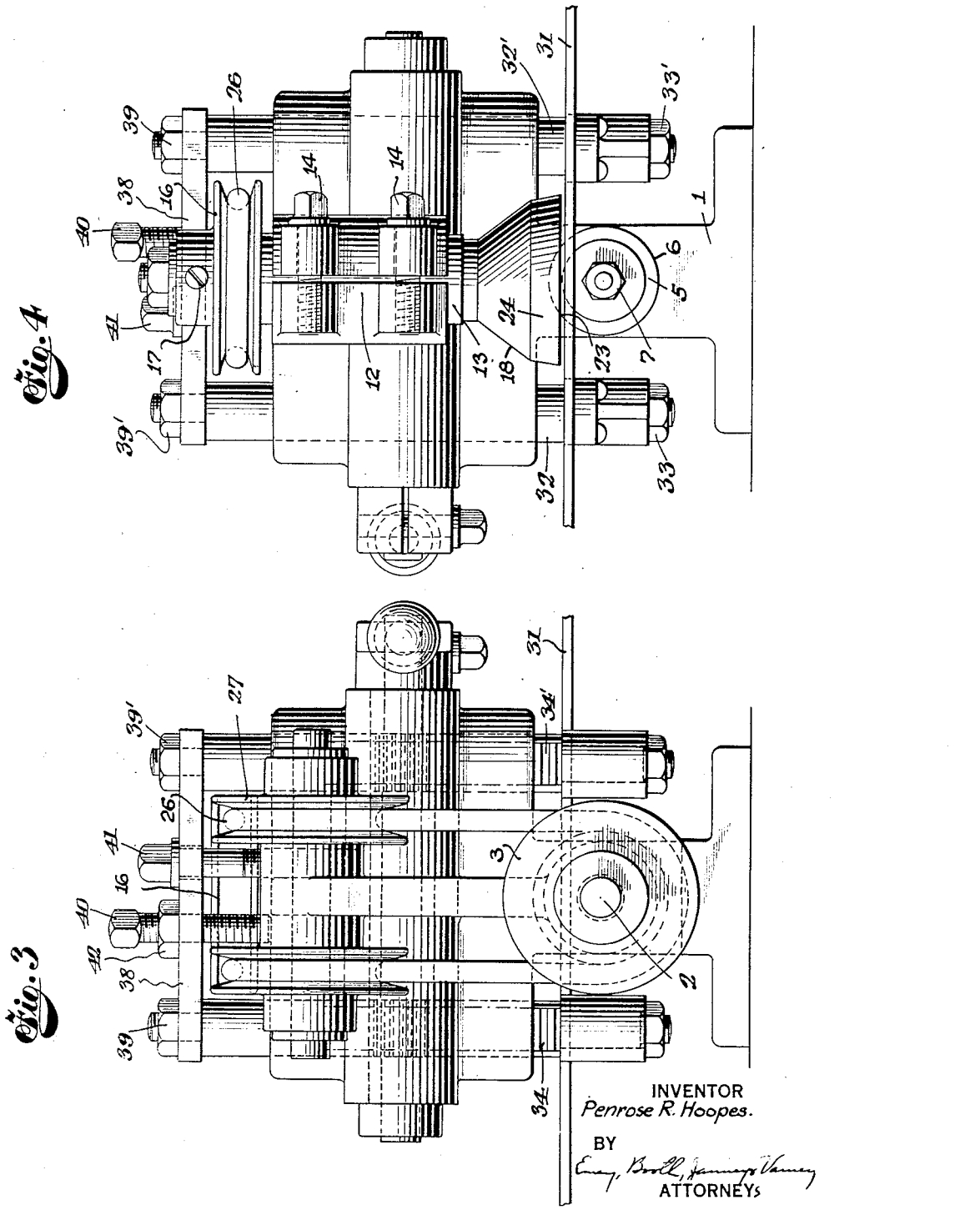

March 11, 1930.    P. R. HOOPES    1,749,882
TRIMMING MACHINE
Original Filed Feb. 26, 1926    4 Sheets-Sheet 4
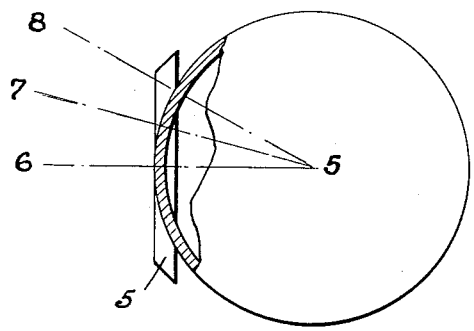
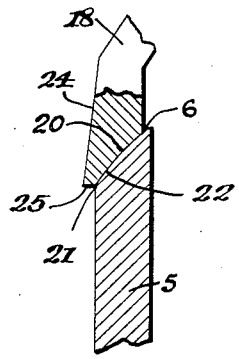
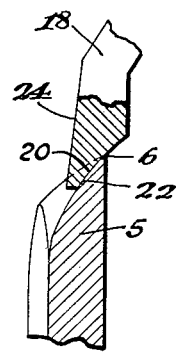
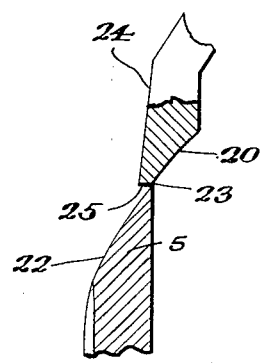
INVENTOR.
Penrose R. Hoopes.
BY
ATTORNEYS.

Patented Mar. 11, 1930

1,749,882

UNITED STATES PATENT OFFICE

PENROSE R. HOOPES, OF HARTFORD, CONNECTICUT, ASSIGNOR TO ESSEX RUBBER COMPANY, OF TRENTON, NEW JERSEY, A CORPORATION OF NEW JERSEY

TRIMMING MACHINE

Application filed February 26, 1926, Serial No. 90,724. Renewed August 14, 1928.

This invention relates to trimming machines and more particularly to machines adapted for trimming the overflow from molded rubber articles.

It is an object of the invention to provide an apparatus which will trim such articles rapidly and effectively. It is a further object of the invention to provide an apparatus which will trim such rubber articles without injury to the body of the article being trimmed.

Other objects of the invention will appear hereinafter.

A preferred embodiment of the invention selected for purposes of illustration is shown in the accompanying drawings, in which, Figure 1 is a top plan view, Figure 2 is a side elevation, Figures 3 and 4 are front and rear elevations respectively, Figure 5 is an enlarged detail view, and Figures 6, 7 and 8 are enlarged detail sectional views taken on the lines 5—6, 5—7, and 5—8 of Figure 5.

As the apparatus disclosed herein is particularly adapted for trimming the overflow from rubber heels, it will be described in connection therewith, although it will be understood that the invention is also applicable for use in trimming various other objects.

Referring to the drawings, the main frame 1 carries a rotatable shaft 2 on one end of which is mounted a pulley 3 which is suitably secured to the shaft as by means of the set screw 4. On the other end of the shaft 2 is mounted a cutting disk 5, said disk being provided with a cutting edge 6. The cutting disk may be keyed or otherwise secured to the shaft and held in place by means of the nut 7.

The shaft 2 is carried in the frame 1 in a manner to permit lengthwise movement thereof with respect to the frame as well as rotative movement, and means are provided for a purpose hereinafter set forth to normally maintain the shaft 2 under yielding tension such as to urge it toward the left as seen in Figure 2. For this purpose a collar 8 is fixed to the shaft 2 as by means of the set screw 9 and the coil spring 10 is interposed between the collar 8 and the bearing 11, said spring being under compression. The bearing 11 may be of any suitable type, that shown herein being of the ball bearing type to reduce friction.

The upper part of the main frame 1 is provided with a boss 12 in which is mounted a bushing 13 which is held tightly in the boss by means of bolts 14. Rotatably mounted within the bushing 13 is a shaft 15 on the upper end of which is mounted a pulley 16, said pulley being suitably secured to the shaft as by means of the set screw 17. On the lower end of the shaft 15 is mounted a cup 18, said cup being secured to the shaft by means of a screw 19.

The outside of the cup is more or less conical in shape, and the inside is hollow, the contour thereof following in general outline that of the outside. The inside of the cup is cut away, preferably by grinding, to provide a surface 20 terminating in a cutting edge 21, forming the inner periphery of the bottom edge of the cup, and the disk 5 is also cut away to provide a surface 22 terminating in the cutting edge 6 previously referred to forming the outer periphery of said disk, the surfaces 20 and 22 being formed in such manner that the cutting edge 6 may contact with the edge 21 to form a point of shear 23.

If desired, the surface 20 may be made slightly concave and the surface 22 may be made slightly convex, as illustrated in the drawings, so that the two may contact over a substantial area to thereby prevent wear. It will be observed, however, that even if the surfaces 20 and 22 are originally conical in shape, frictional contact between the parts will tend to wear them to the concave-convex shape illustrated.

The outside of the cup is provided with a cylindrical surface 24 against which the heel may contact during the trimming operation and which serves as a guide as the heel is being turned to expose all sides to trimming action. Lying between the cutting edge 21 and the cylindrical surface 24 is a narrow portion or flat annular surface 25 which serves to prevent the heel itself from contacting directly with the shearing point and thus preventing injury to the heel itself. On the other hand, the resilience of the rubber is such that a clean cut is obtained and the overflow is removed sufficiently close to the heel that a substantially straight edge results.

Figure 8 which is a section on a line through the point of shear illustrates the manner in which the shearing point is formed by contact of the two edges.

As will be observed, the spring 10 previously described serves to hold the cutting edge 6 of the disk in contact at all times with the cutting edge 21 of the cup, the arrangement being such as to automatically take up whatever wear may occur during operation.

In operation the cup 18 may be rotated by the pulley 16 through a belt 26 leading over the carrier pulleys 27 to the double pulley 28 loosely mounted on the shaft 2. The pulley 28 may be driven by any suitable source of power through the belt 29. The shaft 2 may likewise be rotated by means of the pulley 3 connected to a source of power by the belt 30. The cup 18 may be driven at any desired speeds, although less friction and wear will result if the two are at approximately the same speed.

The heel or other work to be trimmed is laid on the platform 31 and is moved into contact with the bearing surface 24 on the outside of the cup at such point as to expose the overflow or other excrescence to be turned to the action of the cutters at the shearing point, and by turning the heel, all sides may be rapidly exposed to cutting action. As will be observed, the turning of the cup in contact with the heel will assist in turning the same and the cutting operation may be performed rapidly and effectively. At the same time the bearing surface 24 and the portion 25 protect the heel and prevent injury to the body of the heel by preventing it from coming in contact with the cutting edges.

Rubber heels are often provided with depending rims surrounding the nail holes and projecting below the plane of the body of the heel. The fins to be removed lie in the planes of the top and bottom of the heel body and it is therefore desirable to alter the vertical position of the platform 31 in order to bring the fins into correct relation with the trimming point of the machine. In order to compensate for this variation in height of the overflow above the platform, and also in order that fins of different thicknesses may be trimmed, the platform 31 is mounted adjustably with respect to the cutters. The full lines in Figure 2 show the platform in its raised position while the broken lines illustrate the platform in lowered position. The platform is carried on a pair of uprights 32, 32' being secured thereto by means of the nuts 33, 33' and are mounted in such manner that longitudinal motion of the shafts with respect to the frame is permitted. The uprights 32 and 32' are provided with rack teeth 34, 34' which are adapted to mesh with the pinions 35, 35' secured to the cross shaft 36 also rotatably mounted in the main frame. On one end of the shaft 36 is secured an operating lever 37 by which the shaft and pinion may be rotated to lower and raise the platform. A cross bar 38 is mounted across the upper ends of the uprights 32, 32' and is secured thereto by nuts 39, 39', said cross bar having mounted thereon the limit screws 40 and 41. The limit screw 40 is adapted to limit the downward movement of the platform and is threaded through the cross bar 38 and provided with a lock nut 42. The limit screw 41 is adapted to limit the upward movement of the platform and therefore passes loosely through the cross bar 38 and is threaded into the main frame.

It is to be understood that the invention may be variously modified and embodied within the scope of the subjoined claims.

I claim as my invention:

1. In a trimming machine, in combination, a disk having a circular cutting edge lying in its outermost periphery, said disk being mounted for rotation on an axis perpendicular to a plane through said cutting edge, a cup having a circular cutting edge lying in its inner periphery, said cup being mounted for rotation on an axis perpendicular to a plane through said cutting edge, said cup and disk being so mounted with respect to each other that said planes intersect in a line which forms a chord of both circular cutting edges.

2. In a trimming machine, in combination, a disk having a circular cutting edge lying in its outermost periphery, said disk being mounted for rotation on an axis perpendicular to a plane through said cutting edge, a cup having a circular cutting edge lying in its inner periphery, said cup being mounted for rotation on an axis perpendicular to a plane through said cutting edge, said cup and disk being so mounted with respect to each other that the outer cutting periphery of said disk contacts with the inner cutting periphery of said cup to form a point of shear.

3. In a trimming machine, in combination, a disk having a circular cutting edge lying in its outermost periphery, said disk being mounted for rotation on an axis perpendicular to a plane through said cutting edge, a cup having a circular cutting edge lying in its inner periphery, said cup being mounted for rotation on an axis perpendicular to a plane through said cutting edge, said cup and disk being so mounted with respect to each other that said planes intersect in a line which forms a chord of both circular cutting edges, said cup being provided with a cylindrical surface around its outer periphery against which the work to be trimmed may bear.

4. In a trimming machine, in combination, a disk having a circular cutting edge lying in its outermost periphery, said disk being mounted for rotation on an axis perpendicular to a plane through said cutting edge, a cup having a circular cutting edge lying in its inner periphery, said cup being mounted for rotation on an axis perpendicular to a plane through said cutting edge, said cup and disk being so mounted with respect to each other that the outer cutting periphery of said disk contacts with the inner cutting periphery of said cup to form a point of shear, said cup being provided with a cylindrical surface around its outer periphery against which the work to be trimmed may bear, and having a flat annular surface lying between said cylindrical surface and said cutting edge.

5. In a trimming machine, in combination, a disk having a circular cutting edge lying in its outermost periphery, said disk being mounted for rotation on an axis perpendicular to a plane through said cutting edge, a cup having a circular cutting edge lying in its inner periphery, said cup being mounted for rotation on an axis perpendicular to a plane through said cutting edge, said cup and disk being so mounted with respect to each other that said planes intersect in a line which forms a chord of both circular cutting edges, and means to yieldingly hold said disk in contact with said cup.

6. In a trimming machine, in combination, a disk having a circular cutting edge lying in its outermost periphery, said disk being mounted for rotation on an axis perpendicular to a plane through said cutting edge, a cup having a circular cutting edge lying in its inner periphery, said cup being mounted for rotation on an axis perpendicular to a plane through said cutting edge, said cup and disk having mutual contact over a substantial area and being so mounted with respect to each other that said planes intersect in a line which forms a chord of both circular cutting edges.

7. In a trimming machine, means providing a circular cutting edge mounted for rotation on an axis perpendicular to a plane through said cutting edge, means providing a cooperating circular cutting edge mounted for rotation on an axis perpendicular to a plane through said cutting edge, said means being so mounted with respect to each other that said planes intersect in a line which forms a chord of both circular cutting edges.

In testimony whereof, I have signed my name to this specification this tenth day of February, 1926.

PENROSE R. HOOPES.